United States Patent
Sato

(10) Patent No.: US 6,666,539 B2
(45) Date of Patent: Dec. 23, 2003

(54) PRINTING WITH REDUCED OUTLINE BLEEDING

(75) Inventor: Akito Sato, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/214,290

(22) Filed: Aug. 8, 2002

(65) Prior Publication Data

US 2003/0048319 A1 Mar. 13, 2003

(30) Foreign Application Priority Data

Aug. 14, 2001 (JP) ........................................ 2001-245998

(51) Int. Cl.⁷ ................................................ B41J 2/205
(52) U.S. Cl. .............................. 347/15; 347/43; 347/41
(58) Field of Search .............................. 347/15, 43, 41, 347/16, 37

(56) References Cited

U.S. PATENT DOCUMENTS

| 4,198,642 A | | 4/1980 | Gamblin | |
| 4,272,771 A | * | 6/1981 | Furukawa | 347/12 |
| 5,717,448 A | * | 2/1998 | Inada | 347/43 |

* cited by examiner

Primary Examiner—Lamson Nguyen
(74) Attorney, Agent, or Firm—Sughrue Mion, PLLC

(57) ABSTRACT

The present invention is a printing method of recording tones of pixels on the print medium by forming ink dots. The method records tones of pixels such that adjacent pixels in the main scan direction are recorded during different main scans, respectively. This printing method attains sharp images of line-drawing including a text image.

24 Claims, 20 Drawing Sheets

- Sub-scan feed amount
- Raster data used for dot recording during each Main scan

Bleed-suppression by dot skipping
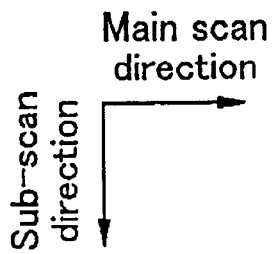
Main scan direction → 
Sub-scan direction ↓
*Fig. 5A*
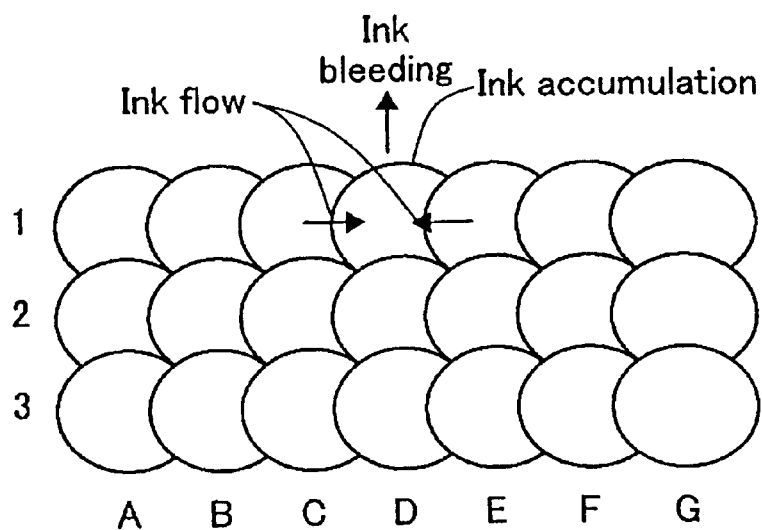
*Fig. 5B*
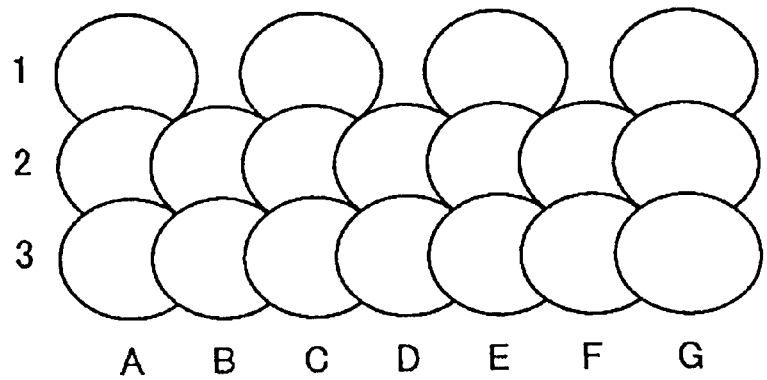

Bleed-suppression by overlap printing
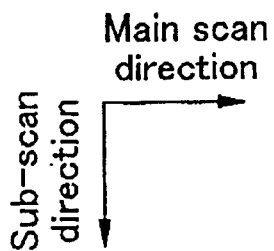
Fig.6A
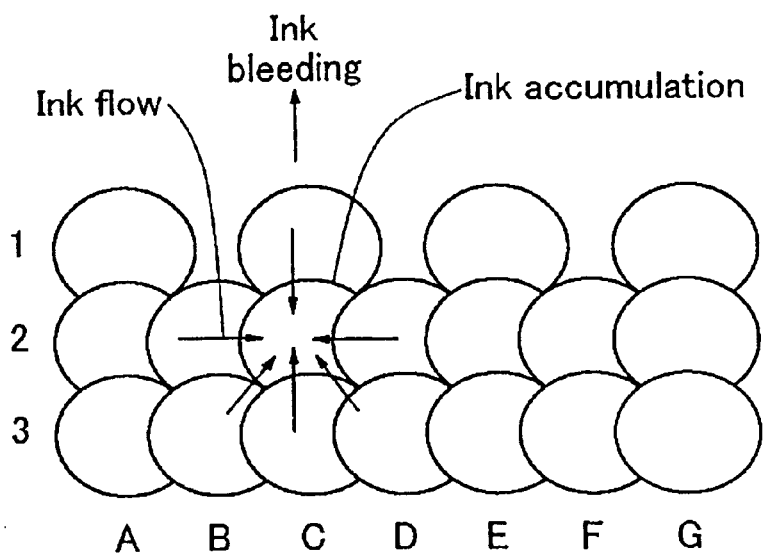
Fig.6B
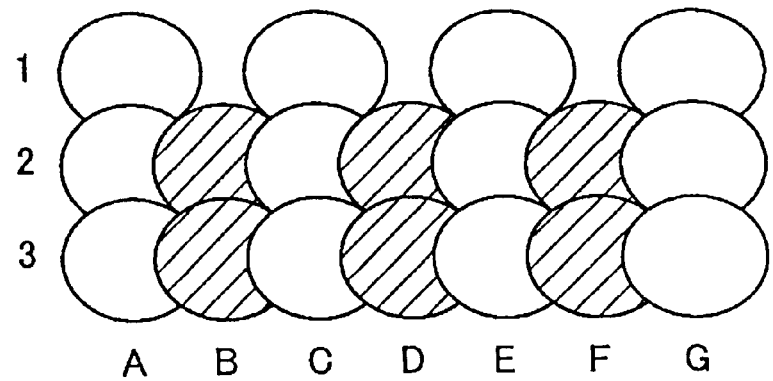

How the high-density nozzle array increases the bleeding in the transverse contour line (2/2)

Fig. 12

Determination of skipping procedure and overlap count

| Print medium | Ink color | Resolution (Main scan × Sub-scan) | Skipping rate | Overlap count |
|---|---|---|---|---|
| Plain paper | Black | 720dpi × 360dpi | 50% | 2 |
| | | 720dpi × 720dpi | 33% | 2 |
| | | 1440dpi × 360dpi | 66% | 2 |
| | | 1400dpi × 720dpi | 50% | 4 |
| | Color | 720dpi × 360dpi | 50% | 1 |
| | | 720dpi × 720dpi | 33% | 1 |
| | | 1440dpi × 360dpi | 66% | 1 |
| | | 1400dpi × 720dpi | 50% | 2 |
| Special paper | Black | 720dpi × 360dpi | 0% | 1 |
| | | 720dpi × 720dpi | 0% | 1 |
| | | 1440dpi × 360dpi | 0% | 1 |
| | | 1400dpi × 720dpi | 0% | 1 |
| | Color | 720dpi × 360dpi | 0% | 1 |
| | | 720dpi × 720dpi | 0% | 1 |
| | | 1440dpi × 360dpi | 0% | 1 |
| | | 1400dpi × 720dpi | 0% | 1 |

First dot pattern
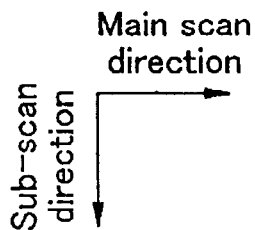
Print mode
  Print medium : Plain paper
  Ink color : Black
  Resolution : 720dpi × 360dpi
Skipping rate of transverse contour line : 50%
Overlap count : 2
Fig. 13A
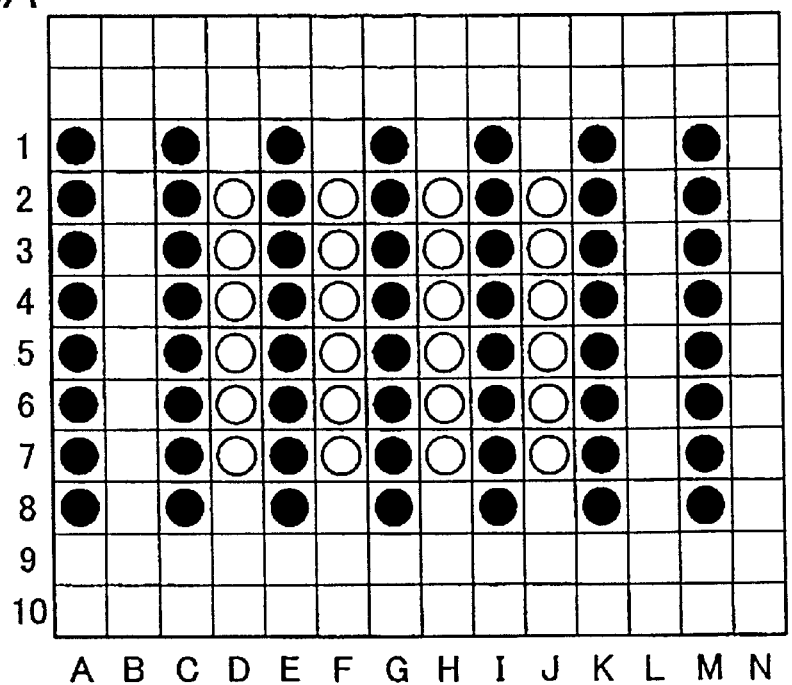
Fig. 13B
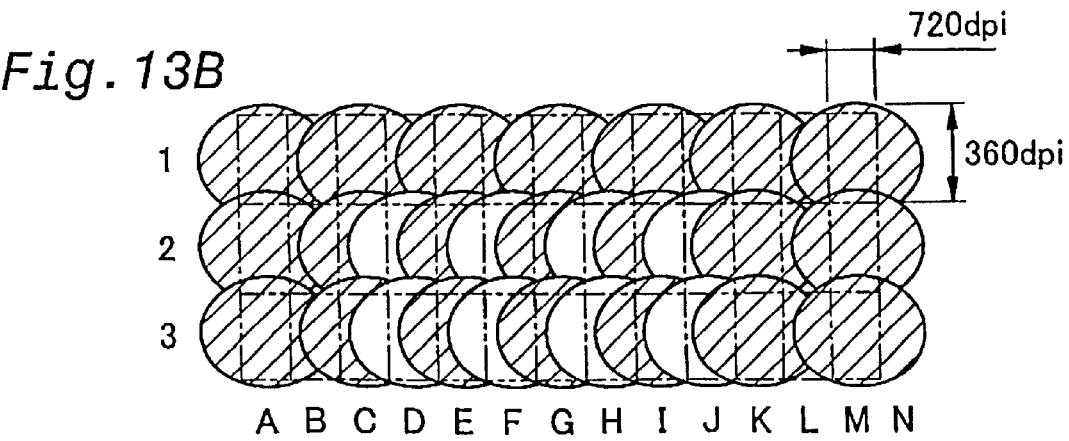

Second dot pattern
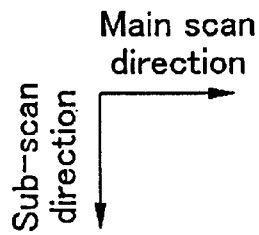
Print mode
 Print medium : Plain paper
 Ink color : Black
 Resolution : 720dpi × 720dpi
Skipping rate of transverse contour line : 33%
Overlap count : 2
Fig. 14A
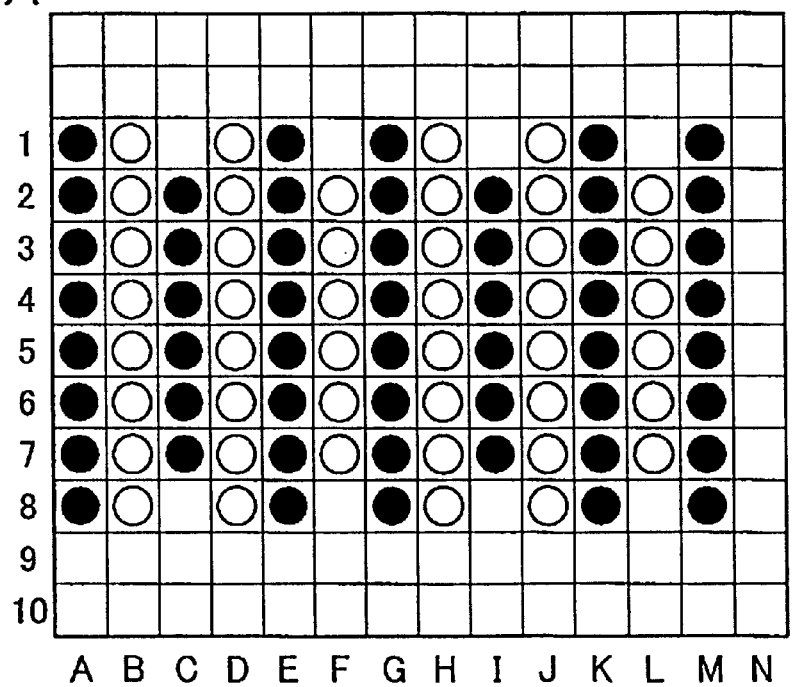
Fig. 14B
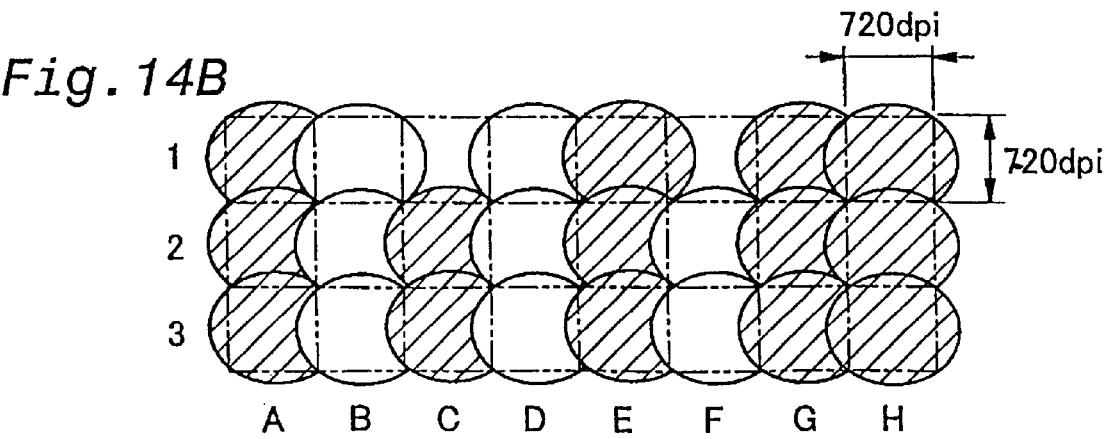

Third dot pattern

Main scan direction →
Sub-scan direction ↓

Print mode
  Print medium : Plain paper
  Ink color : Black
  Resolution : 1440dpi × 360dpi Skipping rate of transverse contour line : 66%
Overlap count : 2

Fourth dot pattern
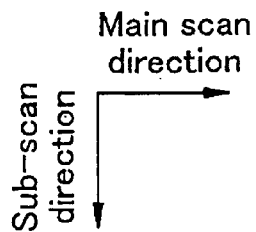
Print mode
 Print medium : Plain paper
 Ink color : Black
 Resolution : 1440dpi × 720dpi
Skipping rate of transverse contour line : 50%
Overlap count : 4
Fig. 16A
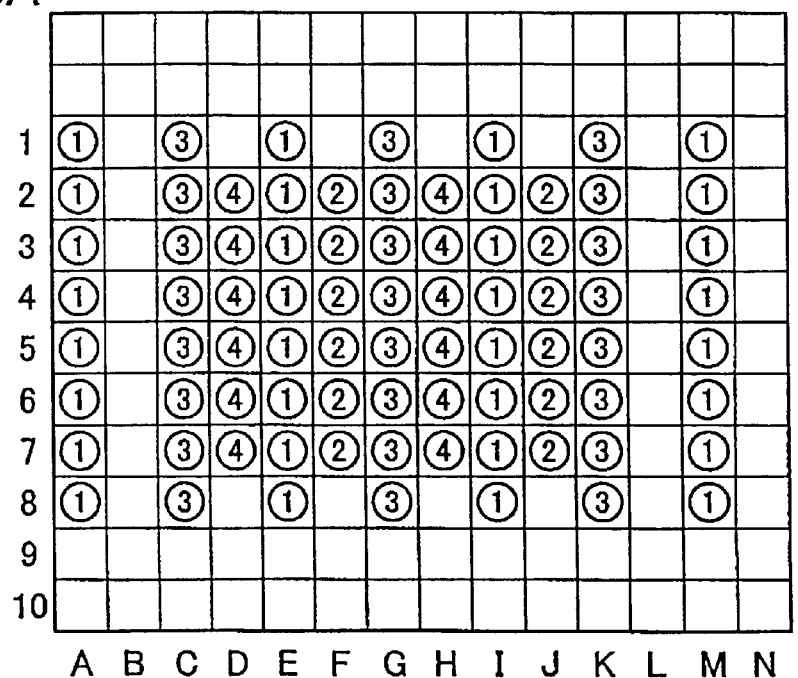
Fig. 16B
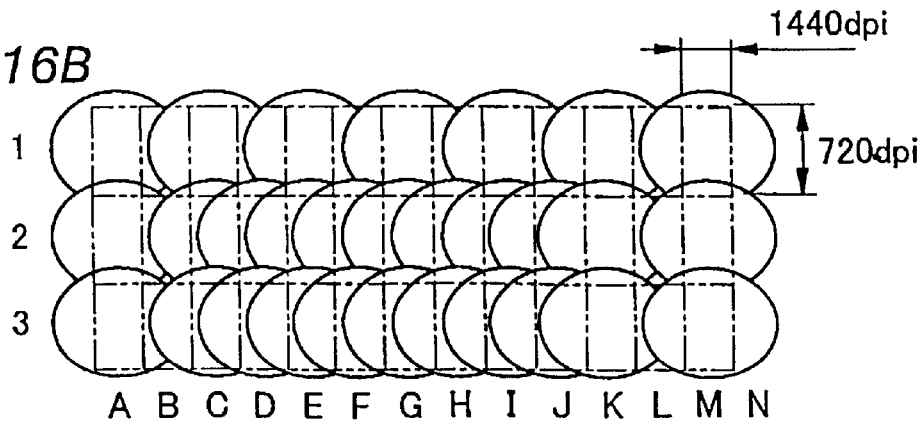

$$\Delta y = \begin{pmatrix} 0 & -1 & 0 \\ 0 & 1 & 0 \\ 0 & 0 & 0 \end{pmatrix}$$

$$\Delta y = \begin{pmatrix} -1 & -k & -1 \\ 0 & 0 & 0 \\ 1 & k & 1 \end{pmatrix}$$

$$\Delta y = \begin{pmatrix} 0 & 1 & 0 \\ 1 & -4 & 1 \\ 0 & 1 & 0 \end{pmatrix}$$

Fig. 19A
Dot pattern before the process

Fig. 19B
Filtering results

Fig. 19C
Identified contour lines

Fig. 19D
Flag F0

Fig. 19E
Dot pattern after the process

Fig. 19F
Another process example

PRINTING WITH REDUCED OUTLINE BLEEDING

BACKGROUND OF THE INVENTION

1. Field of the Invention

The present invention relates to a technique for printing images on a print medium by ink ejection.

2. Description of the Related Art

Ink-jet printers for forming ink dots into images on print media by ejecting ink droplets are widely used as devices for outputting images created by computers and digital cameras.

When line-drawing images such as characters and illustrations are printed by an ink-jet printer, the ink sometimes bleeds along the outlines of the line-drawing image. Such ink bleeding is attributed to the fact that the ink ejected into the line-drawing area accumulates without being absorbed by the print medium, and flows out toward the areas not intended to form dot therein.

In particular, ink dots tend to elongate in the direction of main scan when they are formed while the print head is moved in the direction of main scan, so contour lines extending parallel to the direction of main scan are prone to ink accumulation and bleeding. Also, this kind of bleeding occurs not just with the contour areas of line-drawings, but also in cases when a contour is formed with different colored high-density areas adjacent to each other.

SUMMARY OF THE INVENTION

Accordingly, an object of the present invention is to reduce ink bleeding in an outline portion parallel to the main scan direction in a printing device for printing images by ejecting ink droplets during main scans.

In order to attain the above and the other objects of the present invention, there is provided a method of recording by forming ink dots on a print medium during main scans. The method comprises the steps of: generating dot data from image data indicative of a image to be printed, the dot data representing a state of dot formation at each pixel; identifying a transverse contour line of a specific type image area represented by the dot data, the transverse contour line being parallel to a main scan direction, the specific type image area being composed of pixels at which specific tones are recorded by forming ink dots; adjusting the dot data so as to regularly reduce amounts of an ink for forming ink dots on the identified transverse contour line; and recording tones of pixels on the print medium by forming ink dots in response to the adjusted dot data, wherein this step includes the step of recording each of two pixels which are adjacent in the main scan direction, during each of different main scans, respectively.

In the printing method of the present invention, the dots forming an image on adjacent pixels in the main scan direction are each formed during different main scans. This makes it possible to lengthen the time intervals of ink drop ejection onto this kind of adjacent pixel on the transverse contour line on which bleeding occurs easily. This process reduces the size of the ink accumulations, to thereby suppress bleeding that occurs at transverse contour lines. As a result, it is possible to print sharp images of line-drawings including a text image.

The present invention can be realized in various forms such as a method and apparatus for printing, a method and apparatus for producing print data for a printing unit, and a computer program product implementing the above scheme.

These and other objects, features, aspects, and advantages of the present invention will become more apparent from the following detailed description of the preferred embodiments with the accompanying drawings.

BRIEF DESCRIPTION OF THE DRAWINGS

FIGS. 5A and 5B are explanatory diagrams that shows the state of bleeding occurring and its suppression by dot skipping;

FIGS. 6A and 6B are explanatory diagrams that show the state of suppression of bleeding by performing overlapping printing;

FIG. 12 is an explanatory diagram that shows the method of determining the skipping procedure and the overlap count;

FIGS. 13A and 13B are explanatory diagrams that show the first dot pattern for the embodiment of the present invention;

FIGS. 14A and 14B are explanatory diagrams that show the second dot pattern of the embodiment of the present invention;

FIGS. 16A and 16B are explanatory diagrams that show the fourth dot pattern for the embodiment of the present invention;

FIGS. 19A through 19F are diagrams depicting the manner in which the amount of ink is reduced in accordance with the embodiment of the present invention.

DESCRIPTION OF THE PREFERRED EMBODIMENT

The present invention is explained in the following sequence based on the embodiment.

A. Apparatus Structure:
B. Occurrence of Bleeding and Its Suppression:
C. Printing Processing for the Embodiment of the Present Invention:
D. Dot Skipping Process:
E. Modifications:

A. Apparatus Structure

Figure 1:
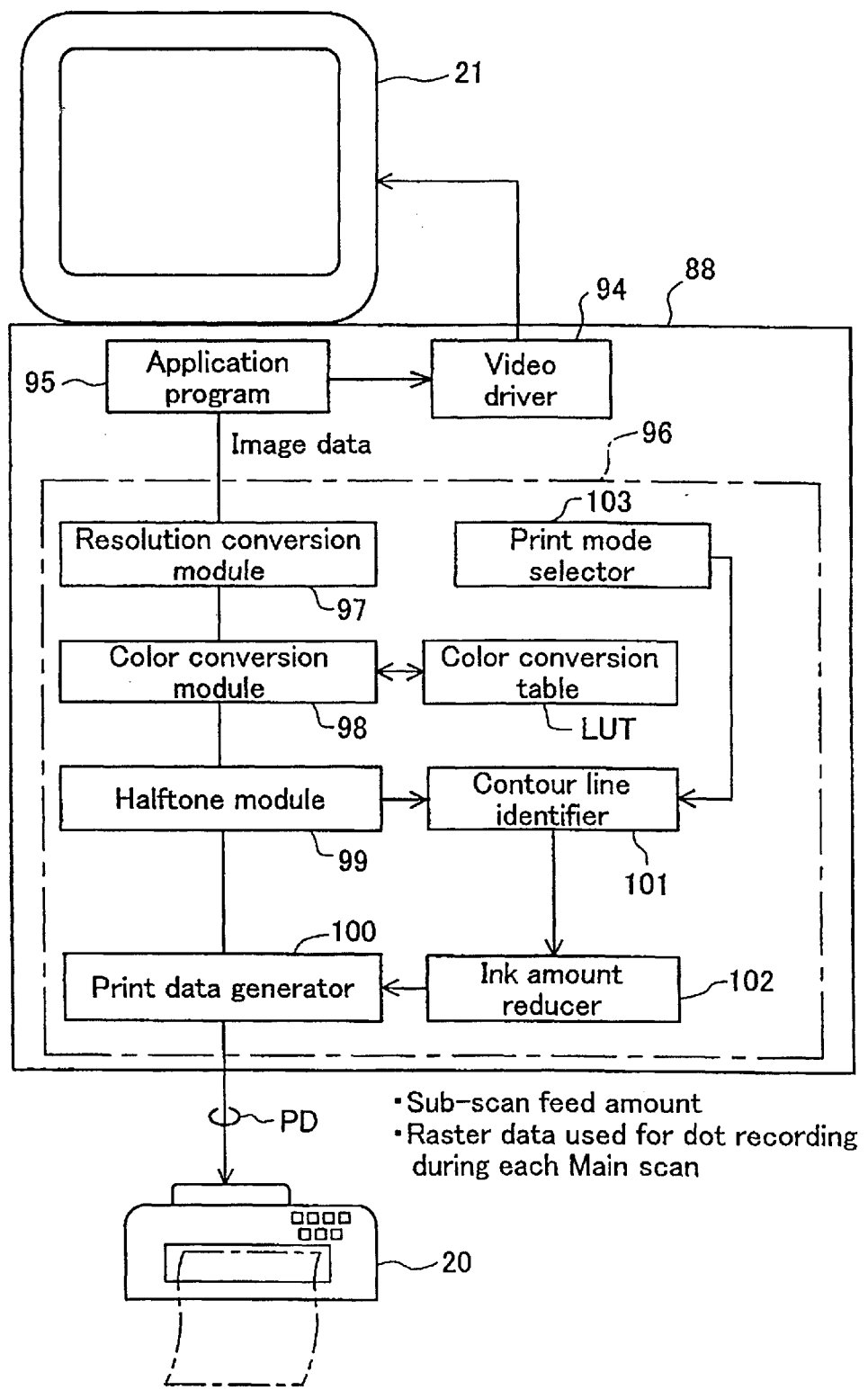
FIG. 1 is a block diagram depicting the structure of a print system configured according to the embodiment of the present invention.

FIG. 1 is a block diagram depicting the structure of a print system configured according to the embodiment of the present invention. The print system comprises a computer 88 as a print control device, and a color printer 20 as a print unit. A combination of the color printer 20 and computer 88 can be broadly referred to as a printing device.

The computer 88 executes an application program 95 with the aid of a special operating system. The operating system has a video driver 94 or printer driver 96, and the print data PD to be forwarded to the color printer 20 are output by the application program 95 via these drivers. The application program 95 processes images in the desired manner and displays these images on a CRT 21 via the video driver 94.

When the application program 95 issues a print command, the printer driver 96 of the computer 88 receives video data from the application program 95, and the result is converted to the print data PD to be sent to the color printer 20. In the example shown in FIG. 1, the printer driver 96 comprises a resolution conversion module 97, a color conversion module 98, halftone module 99, a print data generator 100, a contour line identifier 101, an ink amount reducer 102, a print mode selector 103, and a color conversion table LUT. In the present embodiment, the resolution conversion module 97, color conversion module 98, and halftone module 99 constitute the dot data generator in the claims. The print data generator 100 and the color printer 20 correspond to a tone recorder in the claims.

The role of the resolution conversion module 97 is to convert the resolution (that is, the number of pixels per unit length) of the color video data handled by the application program 95 to a resolution that can be handled by the printer driver 96. The video data whose resolution has been converted in this manner constitute video information, which is composed of the three colors RGB. The color conversion module 98 converts the RGB video data to multi-tone data to obtain a plurality of ink colors suitable the color printer 20. The conversion is performed for each pixel while the color conversion table LUT is referenced.

The color-converted multi-tone data may, for example, have 256 gray scale values. The halftone module 99 performs a halftone procedure designed to represent these gray scale values with the aid of the color printer 20 by forming dispersed ink dots. The halftone data generated as a result of the halftone procedure are queued in the order of the data to be forwarded to the color printer 20 by the print data generator 100, and are output as final print data PD. The print data PD comprise raster data for specifying the manner in which dots are recorded during each main scan, and data for specifying the amount of feed in the direction of sub-scan. The functions performed by the contour line identifier 101, the ink amount reducer 102, and the print mode selector 103 are described below.

The printer driver 96 is a program for executing the functions involved in generating print data PD. The programs for executing the functions of the printer driver 96 are supplied as products stored on computer-readable storage media. Examples of such storage media include floppy disks, CD-ROMs, magneto optical disks, IC cards, ROM cartridges, punch cards, printed matter containing bar codes and other symbols, computer internal storage devices (RAM, ROM, and other types of memory) and external storage devices, and various other types of computer-readable media.

Figure 2:
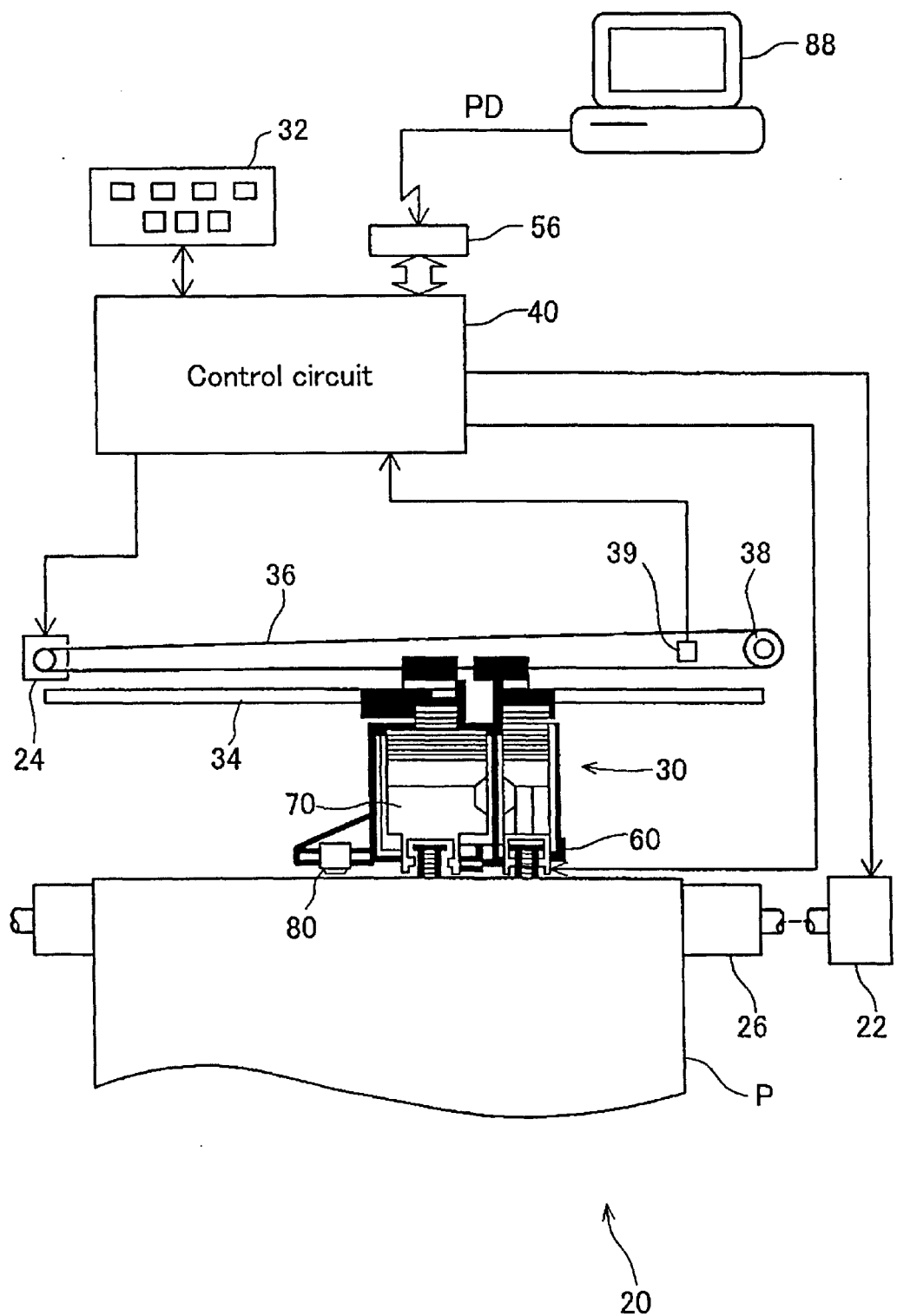
FIG. 2 is a diagram depicting the structure of a printer.

FIG. 2 is a schematic block diagram of the color printer 20. The color printer 20 comprises a secondary scan/feed mechanism for transporting printing paper P in the direction of sub-scan by means of a paper feed motor 22, a main scan/feed mechanism for reciprocating a carriage 30 in the axial direction (direction of main scan) of a platen 26 by means of a carriage motor 24, a head drive mechanism for ejecting the ink and forming dots by actuating the print head unit 60 (print head assembly) mounted on the carriage 30, and a control circuit 40 for exchanging signals among the paper feed motor 22, the carriage motor 24, the print head unit 60, and a control panel 32. The control circuit 40 is connected by a connector 56 to the computer 88.

The secondary scan/feed mechanism for transporting the printing paper P comprises a gear train (not shown) for transmitting the rotation of the paper feed motor 22 to the platen 26 and a roller (not shown) for transporting the printing paper. The main scan/feed mechanism for reciprocating the carriage 30 comprises a sliding shaft 34 mounted parallel to the axis of the platen 26 and designed to slidably support the carriage 30, a pulley 38 for extending an endless drive belt 36 from the carriage motor 24, and a position sensor 39 for sensing the original position of the carriage 30.

Figure 3:
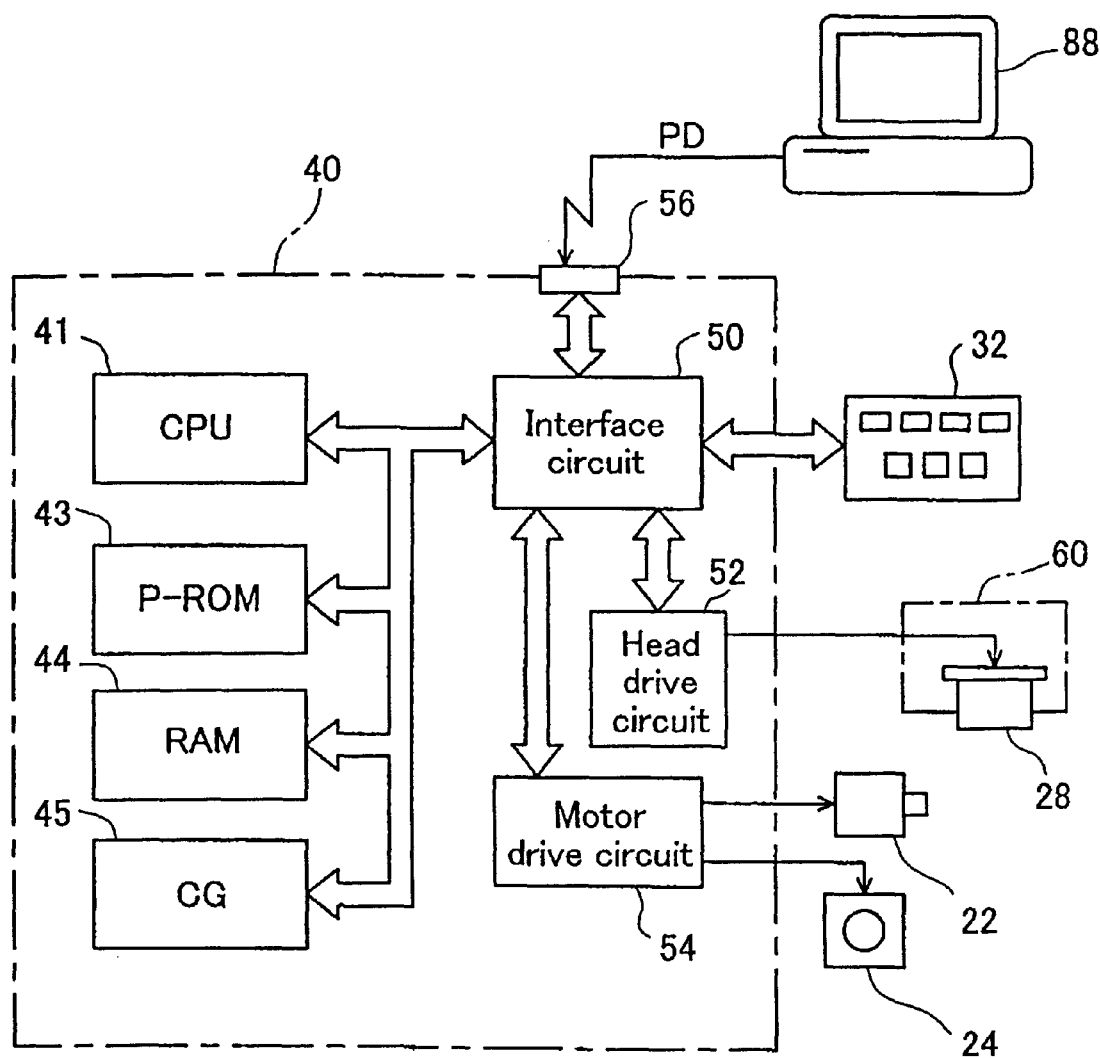
FIG. 3 is a block diagram depicting the structure of the control circuit 40 in a color printer 20.

FIG. 3 is a block diagram depicting the structure of a color printer 20 based on the control circuit 40. The control circuit 40 is composed as an arithmetic Boolean circuit comprising a CPU 41, a programmable ROM (PROM) 43, a RAM 44, and a character generator (CG) 45 containing dot matrices for characters. The control circuit 40 further comprises a dedicated I/F circuit 50 for creating a dedicated interface with external motors and the like, a head drive circuit 52 connected to the dedicated I/F circuit 50 and designed to eject ink by actuating the print head unit 60, and a motor drive circuit 54 for actuating the paper feed motor 22 and carriage motor 24. The dedicated I/F circuit 50 contains a parallel interface circuit and is capable of receiving print data PD from the computer 88 via the connector 56. The color printer 20 prints images in accordance with the print data PD. RAM 44 functions as a buffer memory for the temporary storage of raster data.

The print head unit 60 has a print head 28 and allows ink cartridges to be mounted. The print head unit 60 can be mounted on the color printer 20 and removed there from as a single component. In other words, the print head unit 60 is replaced when the print head 28 needs to be replaced.

Figure 4:
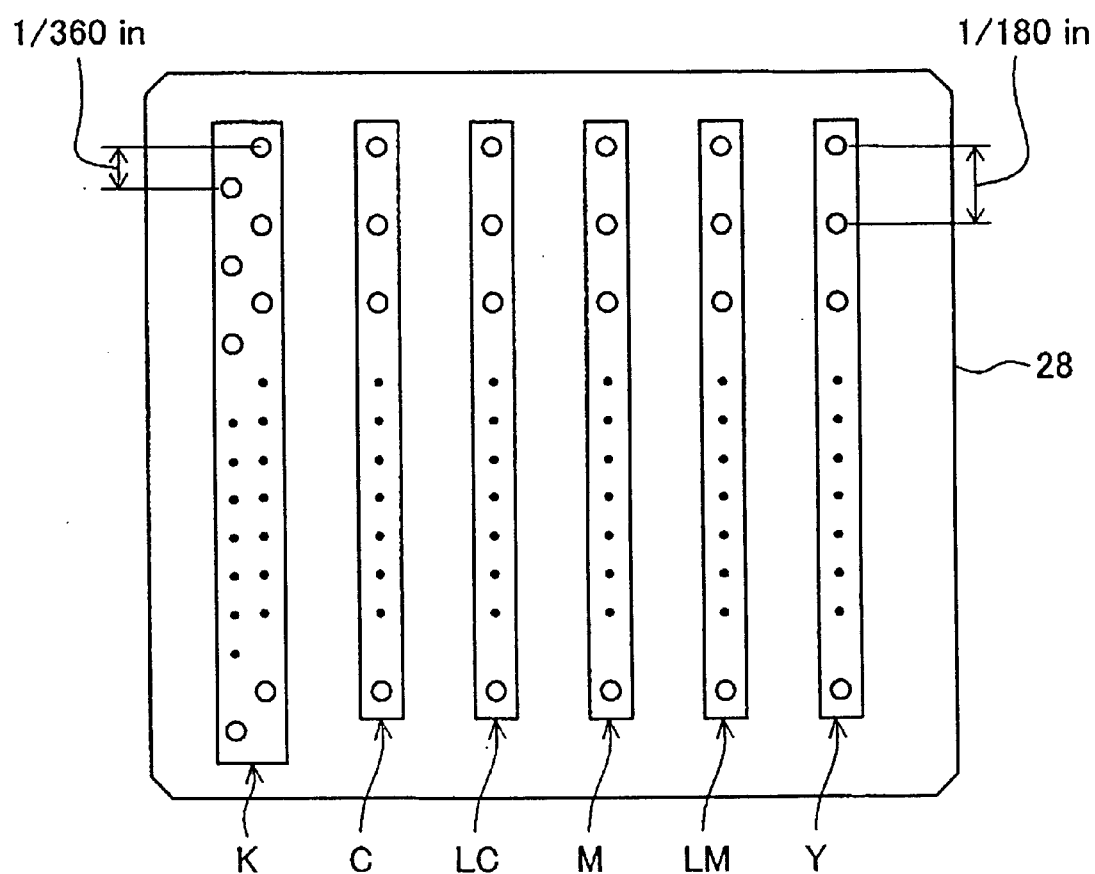
FIG. 4 is an explanatory diagram that snows printing head 28 which includes a high-density nozzle array.

FIG. 4 is an explanatory diagram that shows printing head 28 which includes a high-density nozzle array. Printing head 28 comprises black ink nozzle array K, dark cyan ink nozzle array C, light cyan ink nozzle array LC, dark magenta ink nozzle M, light magenta ink nozzle array LM, and yellow ink nozzle array Y. Black ink nozzle array K is a high-density nozzle array with a nozzle pitch of $\frac{1}{360}$ inch. Here, for this specification, a high-density nozzle array means an array for which the nozzle pitch is $\frac{1}{300}$ inch or less. Meanwhile, the other nozzle arrays have a nozzle pitch of $\frac{1}{180}$ inch so are not high-density nozzle arrays.

The reason that the black ink nozzle array K is a high-density nozzle array is because the number of nozzles is multiplied by two to be able to print black text and line-drawings at high speed. With the printing device of this embodiment, for the printing mode settings described later, when the ink color is set to Black Only, all the nozzles of black in nozzle array K are used and high speed monochromatic printing is performed. Meanwhile, when the ink color is set to Color, by using every other nozzle of black ink nozzle array K, it is used as a nozzle array for which the nozzle pitch is 1/180 inch.

Color printer 20 that has the hardware configuration described above, while carrying paper P using paper feed motor 22, sends carriage 30 back and forth using carriage motor 24, and at the same time drives the piezoelectric element of printing head 28, ejects ink drops of each color to form ink drops and forms a multi-tone image on paper P.

B. Occurrence of Bleeding and Its Suppression:

FIGS. 5A and 5B are explanatory diagrams that show the state of bleeding occurring and its suppression by dot skipping. FIG. 5A is an explanatory diagram that shows the state of bleeding occurring. FIG. 5B is an explanatory diagram that shows the state of bleeding being suppressed by skipping. The white ovals show the ink dots formed at each pixel. The reason that the ink dots are ovals that are long in the main scan direction is that the ink drops arc ejected while the main scan is performed. Here, the numbers 1, 2, and 3 show the raster number, and the letters A, B, C, . . . are for identifying the pixel array for each raster. Note that for both FIGS. 5A and 5B, the first raster forms a transverse contour line that is parallel with the main scan. Contour lines disposed parallel to the direction of main scan will be referred to hereinafter as "transverse contour lines," and those disposed parallel to the direction of sub-scan will be referred to as "longitudinal contour lines."

With the printing device of this embodiment, printing is performed by ejecting ink drops on printing paper while the main scan is performed, so ink drops are continuously ejected on adjacent pixels in the main scan direction. For example, with the example shown in FIG. 5A, ink drops are ejected continuously in the order of the pixel arrays array A, array B, array C, . . . for each raster line. When ink drops are ejected continuously in this way, before the ink drops ejected first are absorbed into the printing paper, new ink drops are ejected at the adjacent pixel, so there are cases when ink drops are fused together on the printing paper and ink accumulations are formed. When ink from these ink accumulations overflows in the sub scan direction, this causes a degradation of the printing image quality due to bleeding.

For example, let's assume that due to variation in the size of the ink drops, that the ink drops ejected on the pixels of array D of the first raster line are larger than the ink drops ejected around that. In this case, the ink of the ink drops ejected on arrays C and E of the same raster line are pulled by surface tension toward the large ink drops ejected on the pixels of array D of the first raster line, forming an ink accumulation. Ink accumulations form easily especially when ink drops are ejected on printing paper for which ink absorption is slow, such as plain paper.

The occurrence of this kind of ink pool can be suppressed to some degree by skipping the dots (dots of the first raster line) that form transverse contour lines as shown in FIG. 5B. This is because there is regular reduction of the ink volume that forms the transverse contour lines. As a result, there is suppression of the bleeding due to overflow of the ink from these ink accumulations. However, if the skipping volume is too high, there is the problem that the contour lines are in fact too rough.

FIGS. 6A and 6B are explanatory diagrams that show the state of suppression of bleeding by performing overlapping printing. Here, overlapping printing means a printing method that forms each raster line using multiple main scans. FIG. 6A is an explanatory diagram that shows the state of bleeding occurring with printing using a high-density nozzle. FIG. 6B is an explanatory diagram showing the state of this bleeding being suppressed by performing overlapping printing. This also shows that dots on which hatching has been performed are formed with a different main scan from dots for which hatching has not been performed on the same raster line.

Figure 7:
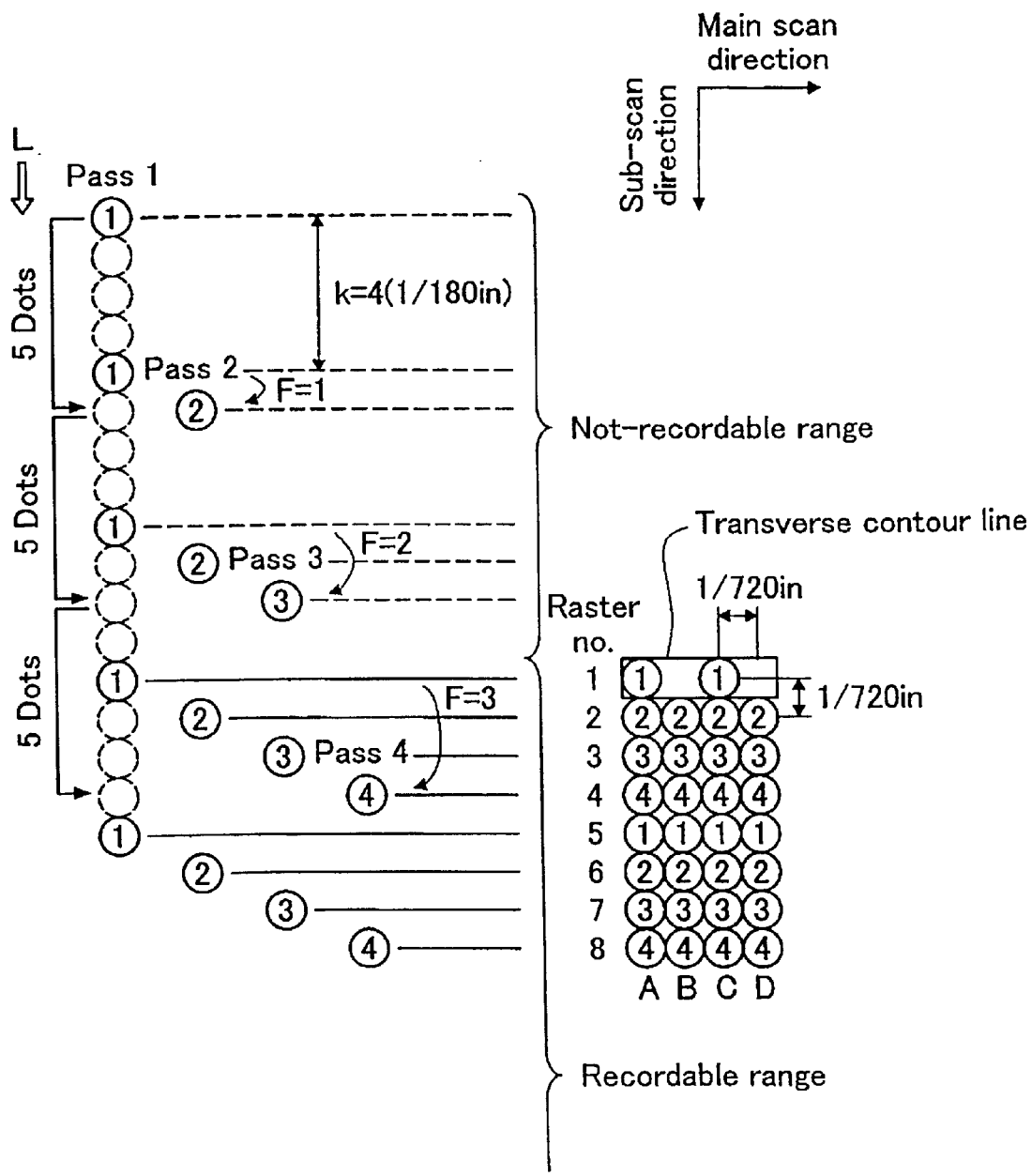
FIG. 7 is an explanatory diagram that shows the state of dots being formed using a nozzle array for which the nozzle pitch is $1/180$ inch.

FIG. 7 is an explanatory diagram that shows the state of dots being formed using a nozzle array for which the nozzle pitch is 1/180 inch. As shown in the Figure, the dots of pitch 1/720 inch (720 dpi) in the sub scan direction are formed using a nozzle array for which the nozzle pitch is 1/180 inch. Here, if we focus on raster lines 1 through 3, with pass 1 (the first main scan), all the dots belonging to the first raster line are formed, and with pass 2, all the dots belonging to the second raster line are formed, and with pass 2, all the dots belonging to the third raster line are formed. Note that the first raster line is a transverse contour line that has undergone skipping processing.

In this way, when forming dots using a above normal nozzle, we can see that the second raster line adjacent to a transverse contour line is formed during a different pass than the third raster adjacent to it. Because of this, if it takes one second until each main scan is completed, the second raster line will be formed one second after the first raster line is formed, and the third raster line will be formed after yet another second has elapsed.

Figure 8:
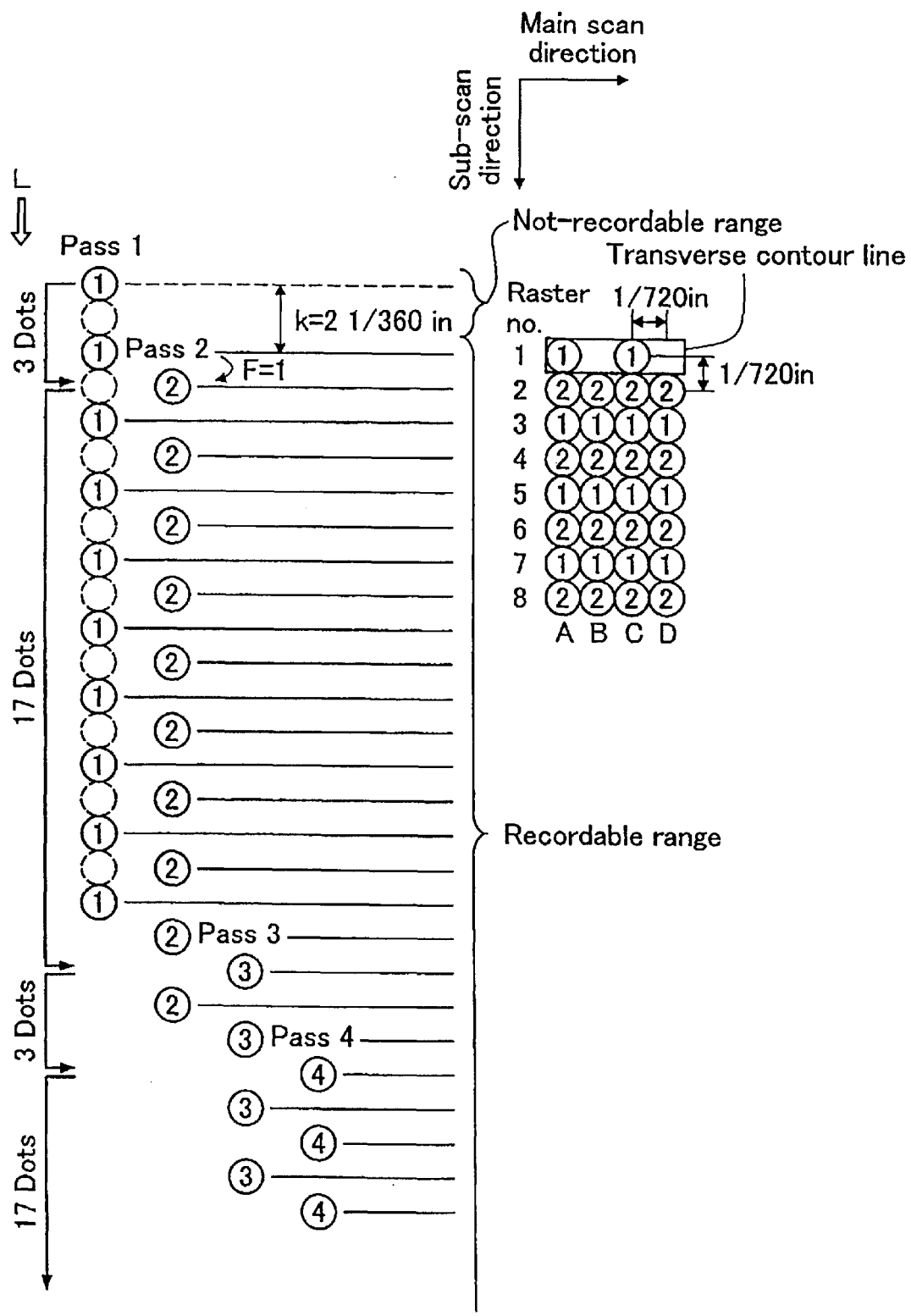
FIG. 8 is an explanatory diagram that shows the state of dots being formed using a high-density nozzle array of nozzle pitch $1/360$ inch.

FIG. 8 is an explanatory diagram that shows the state of dots being formed using a high-density nozzle array in nozzle pitch of 1/360 inch. As shown in the Figure, the dots of pitch 1/720 inch (720 dpi) in the sub scan direction are formed using a nozzle array of nozzle pitch 1/360 inch. Here, if we focus on raster lines 1 through 3, all the dots belonging to the first raster line and third raster line are formed during pass 1, and all the dots belonging to the second raster line are formed during pass 2. Because of this, if it takes one second to complete each main scan as with the previously described case, one second after the first and third rasters lines are formed simultaneously, the second raster line is formed sandwiched between these.

In this way, when dots are formed using a high-density nozzle array, as shown in FIG. 6A, we can see that it is easy for ink to flow from both directions of the first and third raster lines toward the pixels of array C and array E of the second raster line. As a result, ink accumulations are formed mainly at the pixels of array C and array E of the second raster, and this can cause bleeding.

Figure 9:
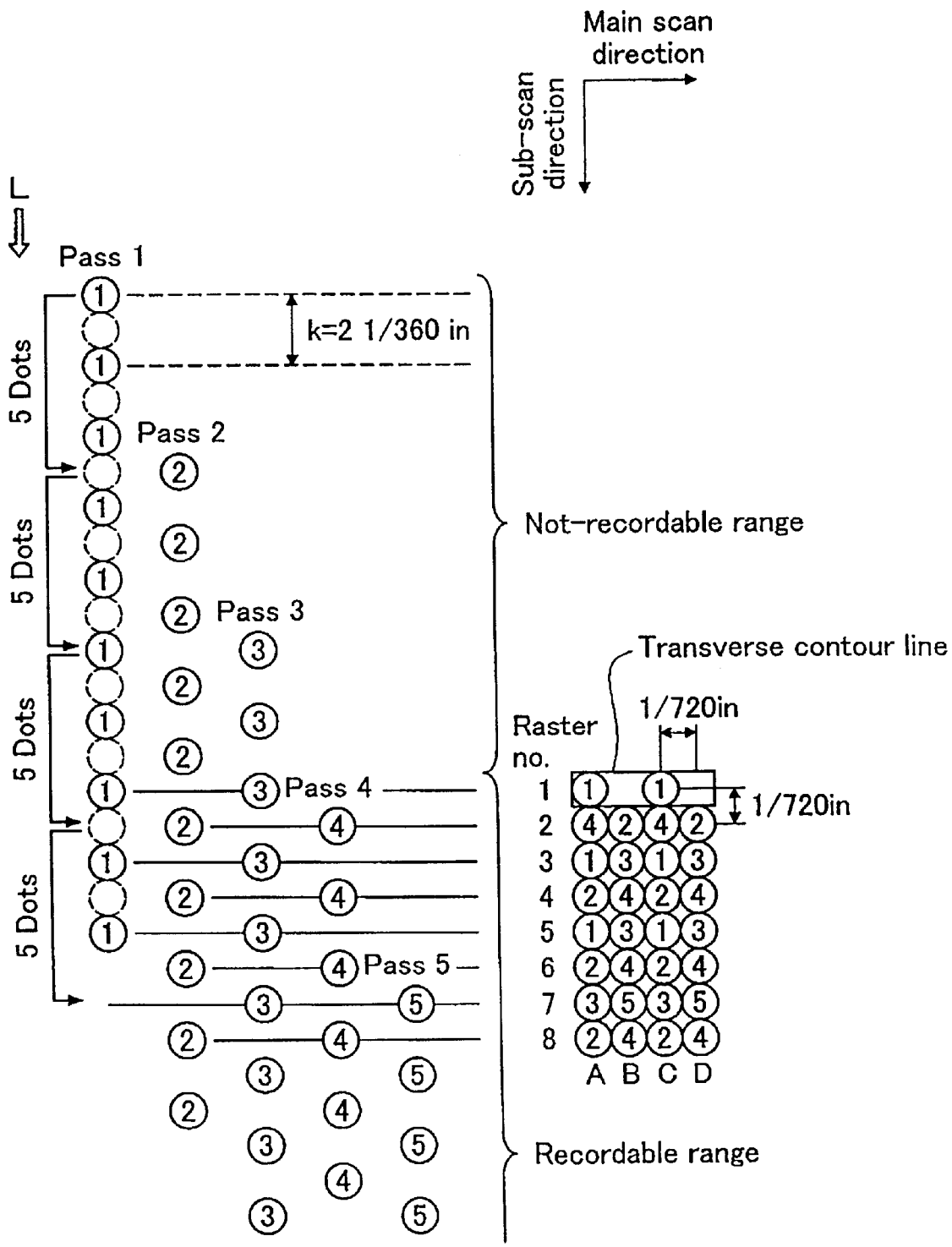
FIG. 9 is an explanatory diagram that shows the state of dots being formed by overlapping printing using high-density nozzle arrays.

FIG. 9 is an explanatory diagram that shows the state of dots being formed by overlapping printing using high-density nozzle arrays. With this example, as shown in FIG. 6B, odd numbered pixel arrays and even numbered pixel arrays are formed during different main scans from each other. Specifically, as shown in FIG. 9, array A and array C of the second raster lines are formed during pass 4, and array B and array D of the same raster lines are formed during pass 2. Because of this, if it takes one second to complete each main scan, three seconds are elapsed from the time ink drops are ejected on the pixels of array A of the first raster line until they are ejected on the pixels of array A of the second raster. During this time, ink is absorbed in the printing paper, so we can see that the flow of ink from the nearby pixels is small. In comparison to this, with non-overlapping printing that forms each raster with a single main scan, as shown in FIG. 8, all the dots of the second raster are formed during pass 2, so the ink flow is relatively high.

Note that it is also possible to execute print data generation such as having array A and array C of the second raster line formed during pass 2 and array B and array D of the same raster line formed during pass 4. However, with this kind of print data generation, ink accumulations can occur easily at the pixels of array A of the second raster line, so it is preferable to execute print data generation as described previously.

As described above, by combining "dot skipping" and "overlapping printing," we can see that it is possible to suppress the occurrence of bleeding at the contour lines that are parallel to the main scan direction. In particular, there is marked occurrence of bleeding when text or line-drawings are printed on plain paper for which ink absorption is slow or when printing is done using a high-density nozzle, but even when this kind of printing is performed, by combining "skipping" and "overlapping printing," we can see that it is possible to realize printed images with clear contours without making the contour excessively rough due to dot skipping.

Figure 10:
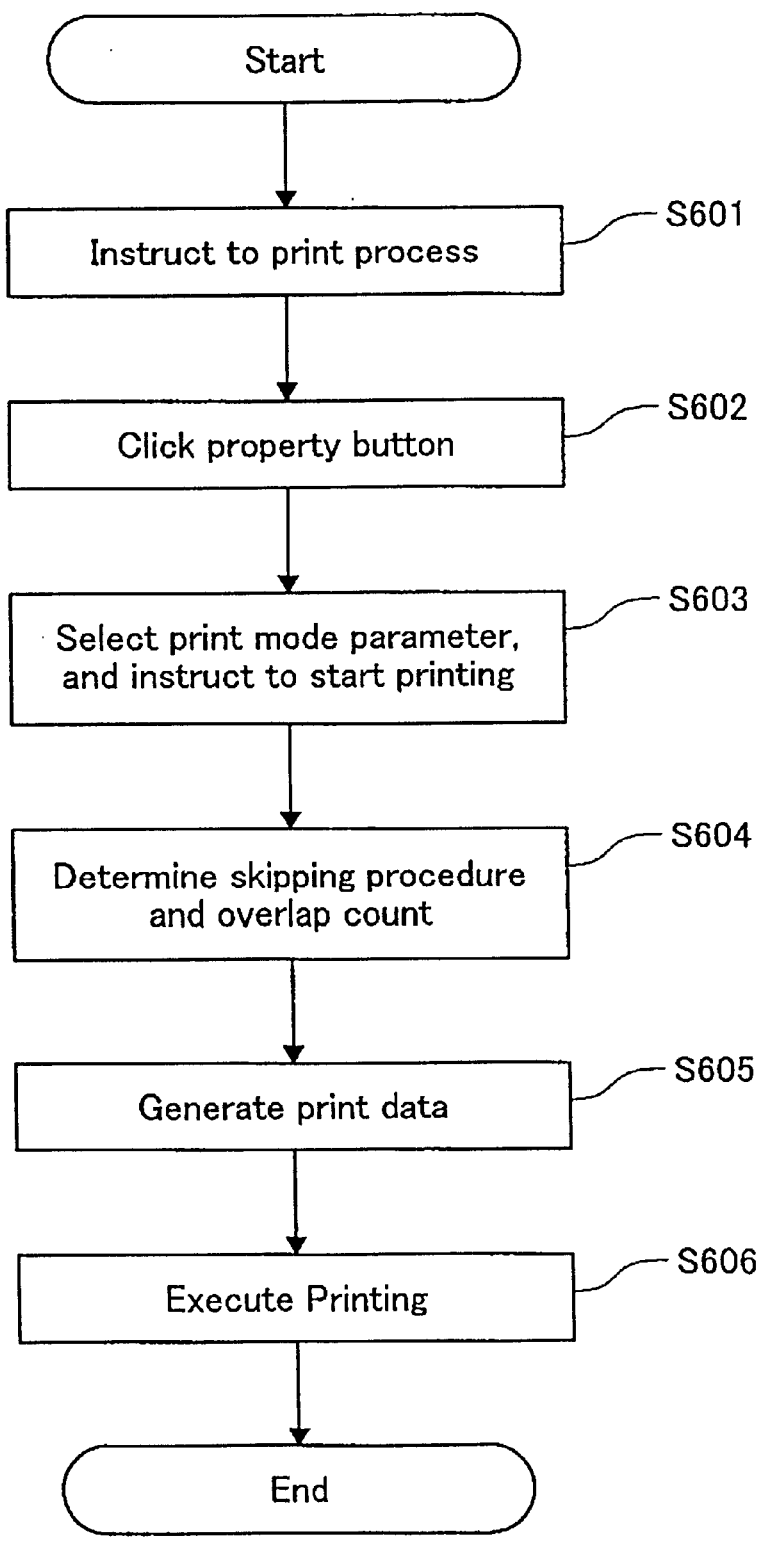
FIG. 10 is a flow chart that shows the printing processing means of the embodiment of the present invention.
Figure 11:
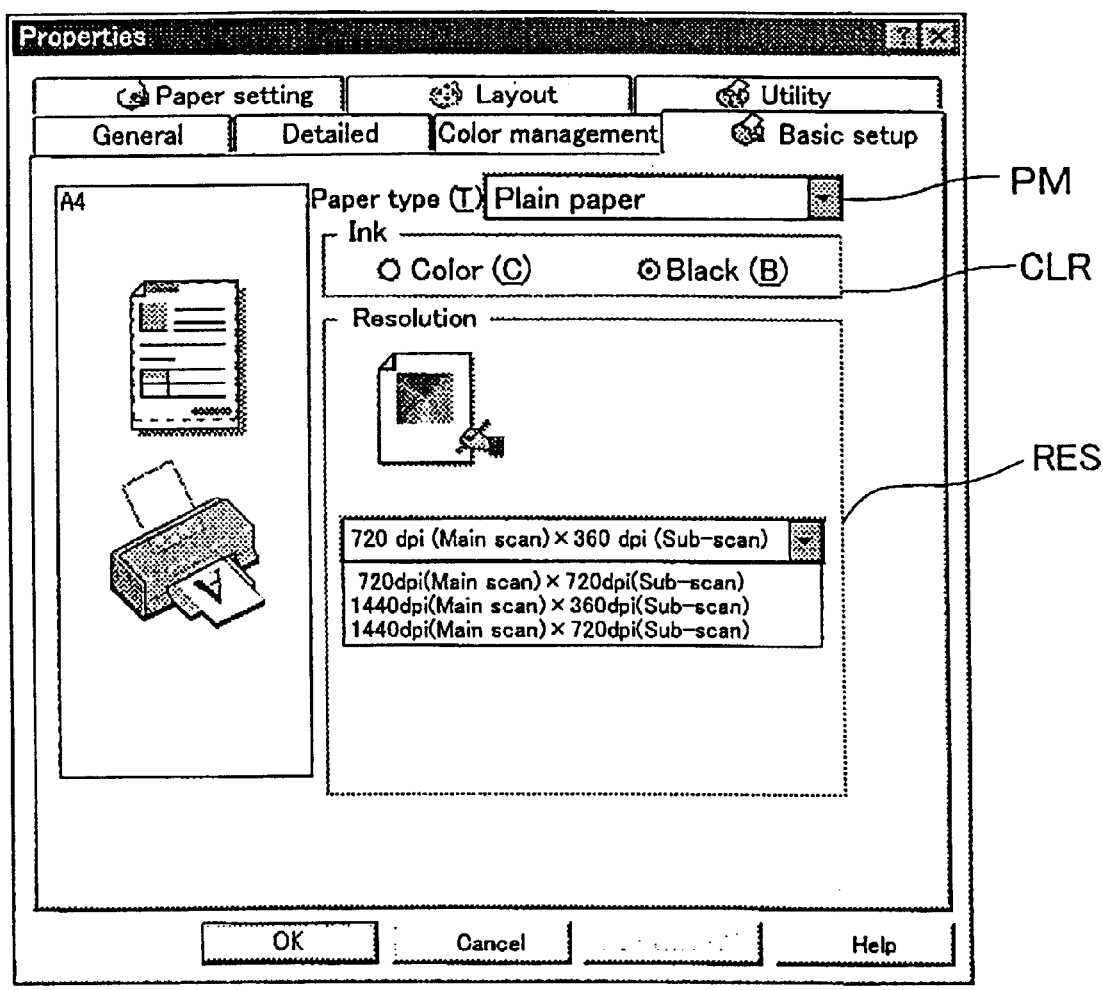
FIG. 11 is a diagram that shows an example of the basic setting screen of the printing mode displayed on CRT 21.

C. Printing Processing For the Embodiment of the Present Invention:

FIG. 10 is a flow chart that shows the printing processing means of the embodiment of the present invention. FIG. 11 is a diagram that shows an example of the basic setting screen of the printing mode displayed on CRT 21. With this printing processing, the "skipping rate" and "overlap count" are changed according to the printing mode parameters of type of printing medium, ink, and color printing resolution. Here, the "skipping rate" means the ratio of ink drops removed from the transverse contour line, and the "overlap count" means the number of main scans that form each raster line.

With step S601, the user instructs computer 88 to print. At step S602, when the Property Button (not illustrated) in the printing dialog box that is displayed on CRT 21 is clicked, the print mode selector 103 (FIG. 1) displays the property setting screen shown in FIG. 11 on CRT 21.

In this property setting screen, the user can specify various parameters for prescribing the printing mode. The basic setting screen of the printing mode in FIG. 11 includes elements like those that follow for specifying various parameters.

(1) Paper type menu PM: Pull down menu for selecting either plain paper or special paper.
(2) Ink color selection button CLR: Button for selecting whether to use color ink or only black ink.
(3) Printing resolution setting menu RES: Pull down menu for selecting the combination of main scan direction and sub scan direction resolutions.

Note that on the detailed setting screen for the printing mode, the user can set other parameters besides these, but the description of these other parameters are omitted for clarity.

At step S603 in FIG. 10, the user sets various parameters of the printing mode, and when an instruction is given to start printing, at step S604, printer driver 96 sets the contents of the skipping processing and the contents of the print data generation. Note that with this embodiment, the contents of the print data generation are set according to the overlap count that is determined as follows.

FIG. 12 is an explanatory diagram that shows the method of determining the skipping procedure and the overlap count. With this embodiment, of the various parameters that stipulate the printing mode, the skipping procedure and the overlap count are determined according to the type of printing medium, ink color, and printing resolution.

With this embodiment, the type of printing medium is divided into plain paper and special paper. There are two ink color choices, "color" and "black only." There are four choices for printing resolution, including 720 dpi×360 dpi (main scan direction×sub scan direction), 720 dpi×720 dpi (same as previous), 1440 dpi×360 dpi (same as previous), and 1440 dpi×720 dpi (same as previous). When the type of printing medium is special paper, regardless of the other printing mode parameters, skipping process and overlap printing are not performed. The reason for this is that the special paper assumed for this embodiment rapidly absorbs ink, so there will be no bleeding even without this type of processing. Meanwhile, when the type of printing medium is plain paper, the contents of the skipping process and overlapping count are determined as follows. In all the examples noted below, the ink color is black. In other words, only the combination of resolutions is different for each.

FIGS. 13A and 13B are explanatory diagrams that show the first dot pattern for the embodiment of the present invention. This is the dot pattern formed for the printing mode for which the printing resolution combination is 720 dpi×360 dpi (main scan direction×sub scan direction). In this case, the skipping rate is set at 50% and the overlap count is set at two. The skipping rate of 50% is achieved by skipping every other transverse contour line dot, and the overlap count of two is achieved by forming each raster line with a main scan that forms dots only in odd numbered pixel arrays and a main scan that forms dots only in even numbered pixel arrays. The reason that the overlap count is set to two is that printing is performed using a high-density nozzle because the ink color is set to black.

In this way, in addition to skipping process, the dots of the pixels of only either the odd numbered array or even numbered array are formed with one main scan, so the ink drops that land on the adjacent pixels in the main scan direction are ejected during different main scans from each other. As a result of this, ink drops do not land continuously on adjacent pixels, so the occurrence of ink accumulations is suppressed and it is less easy for bleeding to occur.

Note that with this example, skipping process (100% skipping) is also performed on dots that contact the inside of the longitudinal contour line (contour line formed by the array A and array M dots). This skipping process is for suppressing bleeding from the longitudinal contour lines that are perpendicular to the main scan direction. The reason that bleeding occurs with longitudinal contour lines is that the resolution of the main scan direction is double the resolution of the sub scan direction.

FIGS. 14A and 14B are explanatory diagrams that show the second dot pattern of the embodiment of the present invention. This is a dot pattern formed by a printing mode for which the printing resolution combination is 720 dpi× 720 dpi. This example is different from the example shown in FIG. 13 in that the skipping rate is 33%. As shown in FIG. 14, the skipping rate of 33% is achieved by skipping one dot of the transverse contour line every two dots. Note that with this example, the main scan direction resolution and the sub-scan direction resolution are the same, so skipping processing is not performed on dots that contact the inside of the longitudinal contour lines.

Skipping is performed because there is the risk that bleeding will occur on the transverse contour line if skipping is not done because the ink drops are long in the main scan direction with the printing device of the embodiment. The reason that the ink drops are long in the main scan direction is that as described above, the ink drops are ejected while the main scan is being performed with the printing device of the embodiment.

Figure 15A:
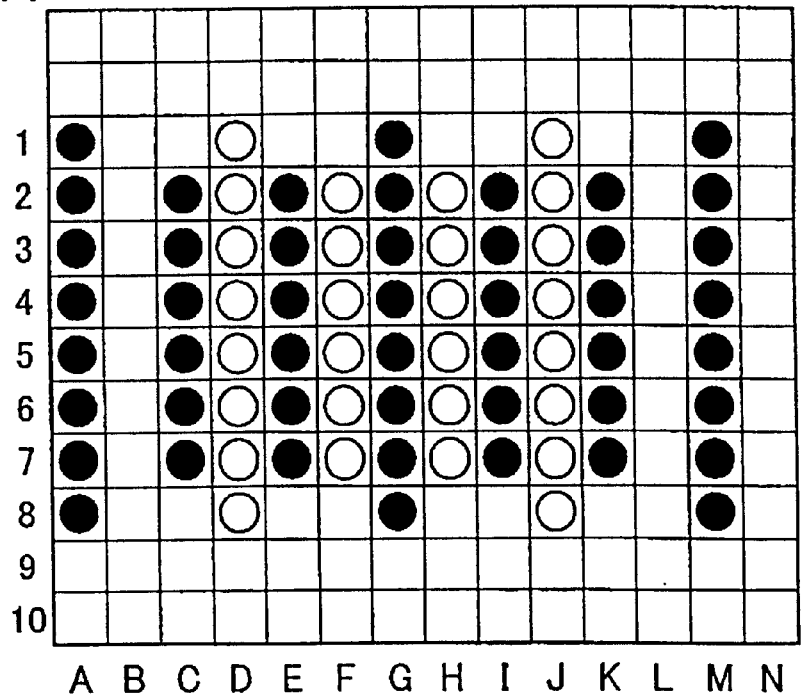
FIGS. 15A and 15B are explanatory diagrams that show the third dot pattern of the embodiment of the present invention.
Figure 15B:
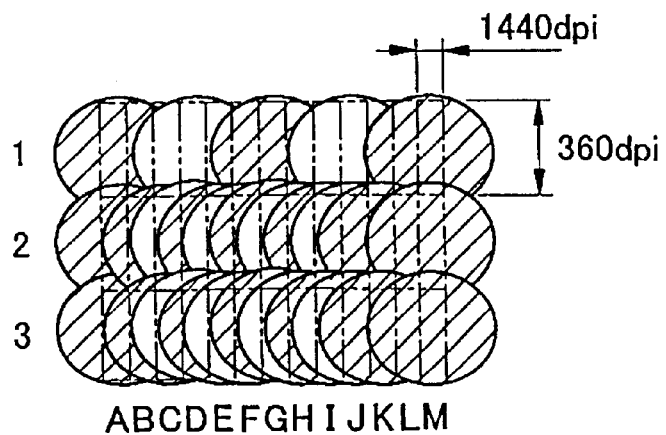

FIGS. 15A and 15B are explanatory diagrams that show the third dot pattern of the embodiment of the present invention. This dot pattern is formed by a printing mode for which the printing resolution combination is 1440 dpi×360 dpi. This example differs from the examples shown in FIGS. 13 and 14 in that the skipping rate is 66%. As shown in FIG. 15, the skipping rate of 33% is achieved by skipping two dots each for every other dot of the transverse contour line.

In this way, with the examples noted above, the skipping rate is adjusted according to the resolution combination. In other words, when printing with a printing resolution combination for which the ratio of the main scan direction printing resolution in relation to the sub scan direction printing resolution is relatively large, the skipping rate is adjusted to be higher than when printing with a printing resolution combination for which the resolution ratio is relatively small. Specifically, the settings are made such that with the first example, a skipping rate of 50% is set according to a combination of 720 dpi×360 dpi (the resolution ratio is two), and with the second example, a skipping rate of 33% is set according to a combination of 720 dpi×720 dpi (the resolution ratio is one), and with the third example, the resolution ratio is 4). Note that the skipping rate setting is made taking into consideration not only the printing resolution ratio noted above, but also the size of the ink drops that can be ejected from the nozzle, and the ease of absorption of ink into the printing medium.

If the skipping rate is adjusted according to the ratio of the main scan direction resolution to the sub scan direction resolution in this way, there is the advantage that it is possible to realize clear contours with the maximum amount of ink soaked into the pixels that form the transverse contour lines in the range for which ink accumulations would be limited.

FIGS. 16A and 16B are explanatory diagrams that show the fourth dot pattern for the embodiment of the present invention. This is a dot pattern formed by a printing mode for which the printing resolution combination is the maximum resolution of 1440 dpi×720 dpi. This example differs from the dot patterns described above in that the overlap count is increased to 4. By doing this, for the transverse contour line, though not the dots formed on the adjacent pixels in the main scan direction, even adjacently formed dots in the main scan direction are formed during different main scans. As a result, it is possible to even further suppress bleeding at the transverse contour line.

For example, with this example, as shown in FIG. 16, the dots formed on the pixels of array A and array C of the first raster lines are formed during different main scans. With the first dot pattern for which the skipping rate is the same 50%, these dots are formed during the same main scan, as shown in FIG. 13.

Note that the overlap count of dour is achieved by forming dots only on either the pixel array that is the (4n+1) array, the (4n+2) array, the (4n+3) array, or the (4n+4) array for each main scan. Here, n is a non-negative integer.

Note that the contents of the skipping processing set in this way and the contents of the print data generation set according to the determined overlap count are used throughout the entire printing job.

At step S605 of FIG. 10, printer driver 96 performs generation of printing data according to the skipping procedure and print data generation contents determined for use at step S604. At step S606, printer 20 executes printing according to the printing data supplied from computer 88.

In this way, with this embodiment, the skipping procedure and print data generation contents performed with the actual printing are determined according to the three printing mode parameters of type of printing medium, ink color, and printing resolution. As a result of this, there is the advantage of being able to perform skipping processing and print data generation that is preferable according to the printing mode.

Figure 17:
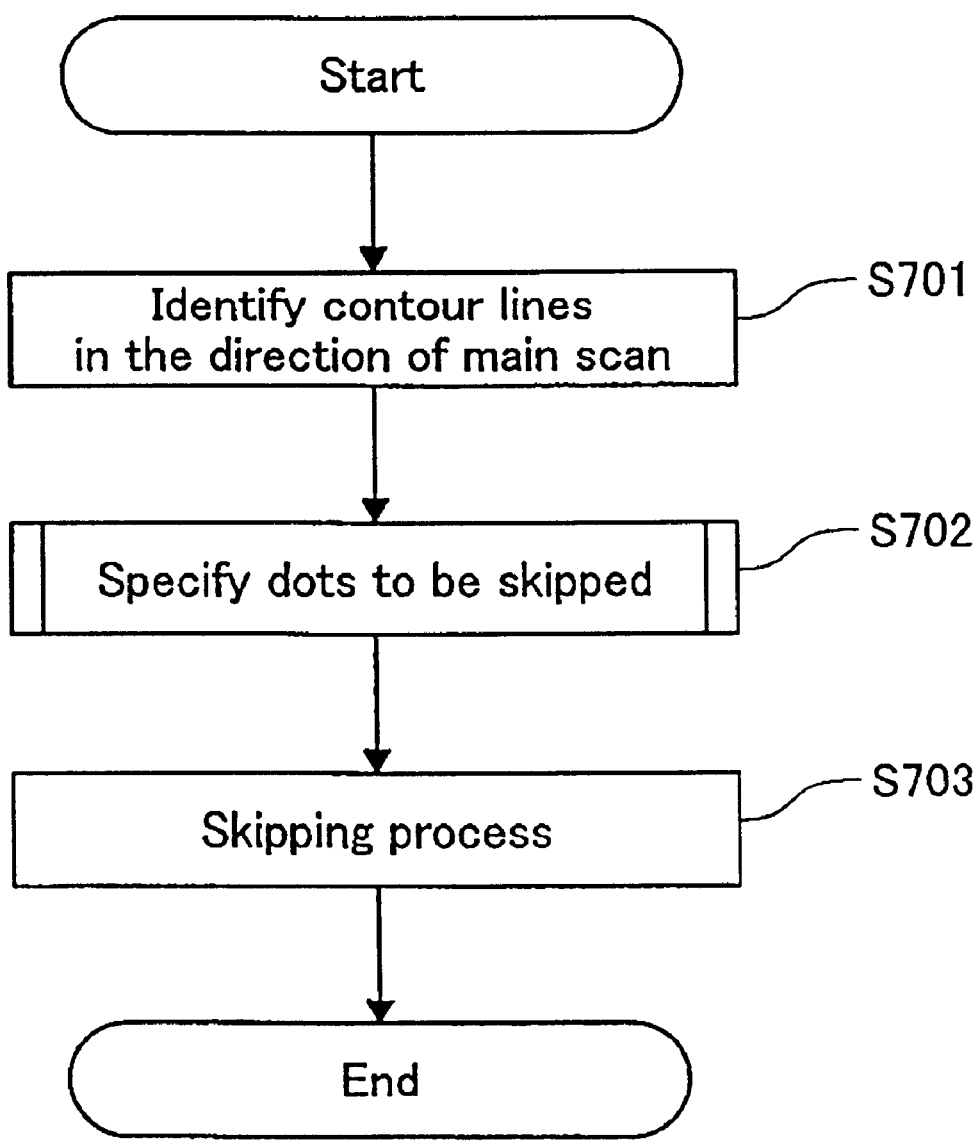
FIG. 17 is a flowchart of a dot skipping procedure performed in accordance with the first working example of the present invention.

D. Example of Dot Skipping Processing:

FIG. 17 is a flowchart of a dot skipping procedure performed in accordance with the embodiment of the present invention. According to the embodiment, every second dot in the contour lines disposed parallel to the direction of main scan is skipped, as shown in FIGS. 13A and 13B. The amount of ink is thus reduced in a systematic manner in the direction of main scan, and less ink is deposited along the contour lines.

Figures 18A, 18B, 18C:
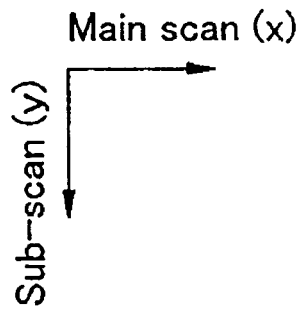
FIGS. 18A through 18C depict the filters used to identify contour lines according to the embodiment of the present invention.

In step S701, the contour line identifier 101 identifies the contour lines that are parallel to the direction of main scan. In the present embodiment, a first derivation filter such as the one shown in FIG. 18A may be used as the simplest contour line identification filter for such identification. This filter has directionality in the direction of sub-scan and can identify contour lines that are parallel to the direction of main scan. As used herein, the term "contour line" refers to an area of single pixel width that defines the outermost boundary of an image area composed of pixels at which specific tones are recorded by forming ink dots. Such a line is disposed adjacent to a discontinuity whose unique attributes (dot size or color) define this image area. The discontinuity may be a border between dot-forming pixels and dot-free pixels, as shown, for example, in FIGS. 13A and 13B.

The contour line identification filter can be any filter capable of identifying transverse contour lines. It can be a directional filter such as the one shown in FIG. 18B, or a non-directional filter such as the one shown in FIG. 18C.

FIG. 19 is a diagram illustrating the ink rate reduction procedure. FIG. 19A depicts the dot pattern existing prior to the ink rate reduction procedure. In this example, a single type of dot size is involved, and the halftone data can assume only two values: "0" (dot absent) and "1" (dot present). The empty columns in the drawings depict cases of zero data. Applying the above-described first derivation filter to this dot pattern yields results such as those shown in FIG. 19B. These filtering results indicate that although the contour lines on the upper side of an image are identified unchanged, the contour lines on the lower side of the image appear as contour lines of opposite sign at pixel positions disposed one pixel lower. Contour lines such as the one shown in FIG. 19C can be obtained by reversing the sign of the contour lines on the lower side of the image and moving them one pixel higher.

In step S702, the ink amount reducer 102 specifies the dots to be skipped. The number of skipped dots may, for example, be equal to about half the dots in a contour line, in which case even-numbered dots are skipped in the direction of main scan. As a result, the amount of ink supplied to form a contour line can be reduced in half, and the dots extended in the direction of main scan can be joined together, making it possible to minimize ink accumulation.

Figure 20:
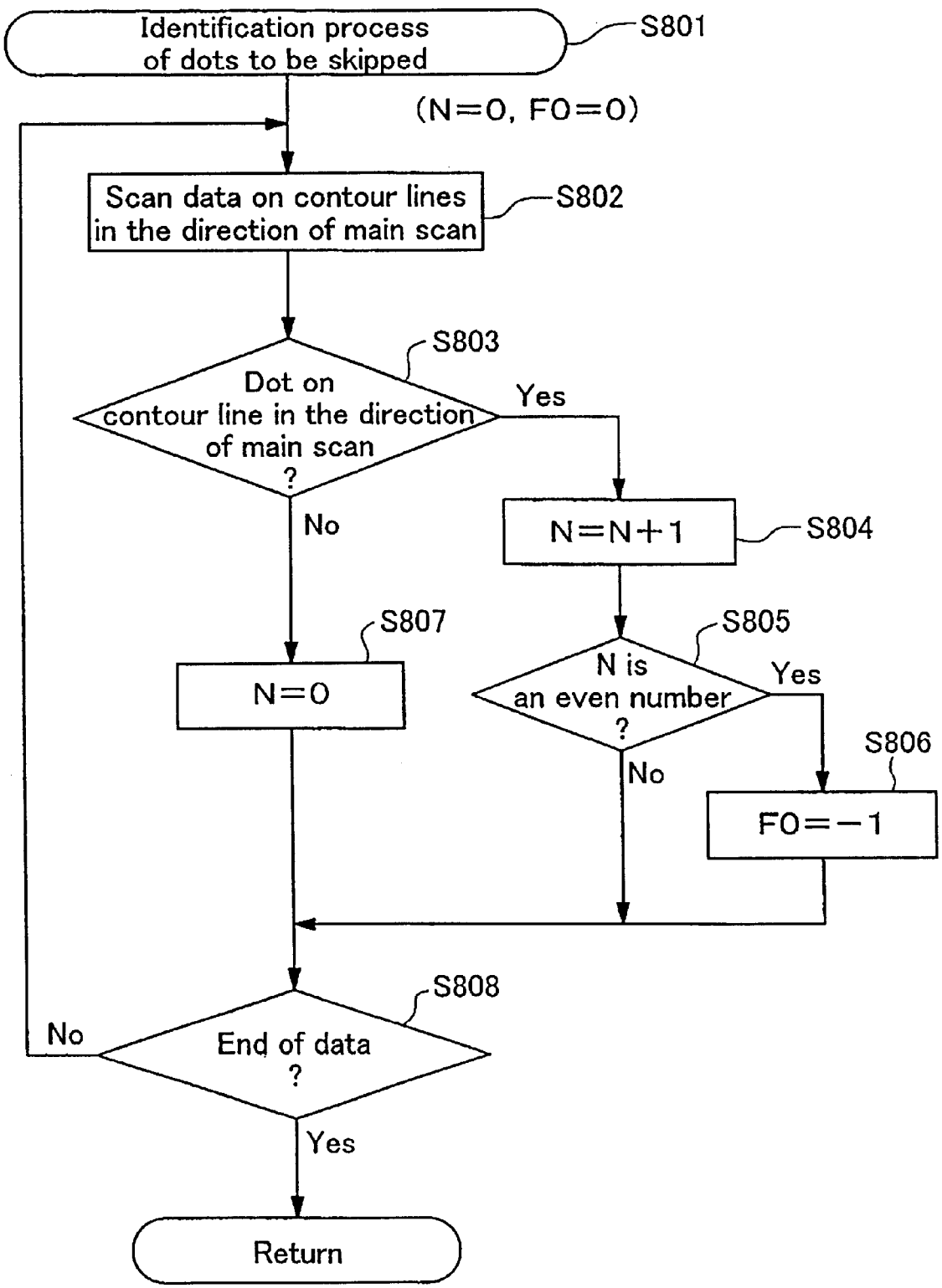
FIG. 20 is a flowchart depicting the exact order in which the dots to be skipped are processed in a specific manner during step S702.

FIG. 20 is a flowchart depicting the exact order in which the dots to be skipped are processed in a specific manner during step S702. In step S801, default setting are selected by the ink amount reducer 102. This default be skipped are set to zero for each pixel. In step S802, the ink amount reducer 102 scans the data processed in step S701 in the direction of main scan for each scan line. In step S803, the ink amount reducer 102 determines whether a dot is on a contour line in the direction of main scan. This determination can be performed based on the corresponding pixel value with the aid of the result obtained in step S701. In the example under consideration, it can be concluded that a dot is on the contour line if the pixel value is one. The operation proceeds to step S804 if it is determined that the dot is on the contour line, and to step S807 if it is determined that the dot is outside the contour line.

In step S804, the ink amount reducer 102 counts the dots on the contour line. In step S805, the ink amount reducer 102 selects a setting for the flag F0 based on the count. Specifically, "−1" is selected for the flag F0 of a pixel, indicating that the dot is to be skipped, if an even count N is obtained (step S806). Conversely, the default setting of 0 is retained for the flag F0 if an odd count N is obtained.

In step S803, the count N is reset to zero if the ink amount reducer 102 has determined that the dot lies outside the contour line in the direction of main scan. A flag F0 such as the one shown in FIG. 19D can be obtained as a result of such processing. Such flags F0 represent data for specifying the dots to be skipped. Obtaining this processing result concludes the procedure for specifying the dots to be skipped (step S702 in FIG. 17).

In step S703, the ink amount reducer 102 skips some dots. The procedure is performed by a method in which the values of pixels specified by the flag F0 in FIG. 19D are changed from the unprocessed dot pattern shown in FIG. 19A. In this example, the dots are skipped by a method in which the values of pixels with a flag F0 of −1 are changed from "1" to "0" in the unprocessed dot pattern shown in FIG. 19A. A sparser dot pattern (FIG. 19E) is thus obtained.

Such skipping can regularly reduce the amount of ink supplied to form the dots for the contour lines disposed parallel to the direction of main scan, which is the direction in which the ink tends to accumulate. Bleeding from the contour line can be reduced as a result. Although the above example was described with reference to a case in which the amount of ink was regularly reduced by the skipping of even-numbered dots, the concept of "systematic" is not limited to this method alone. It is possible, for example, to adopt a method in which one out of every three dots is skipped.

The amount of ink supplied to form a contour line is not necessarily reduced by skipping some dots. For example, the amount of ink can be reduced by reducing dot size. Alternatively, the method in which the amount of ink is reduced in a systematic manner can be limited to cases in which large dots are formed.

In the above example, the amount of ink was reduced by deleting even-numbered dots from a continuous series of dots extending in the direction of main scan in step S805. Even with even numbers, however, it is inadvisable to skip any dots in a contour line disposed in the direction of sub-scan. As shown, for example, in FIG. 19F, a contour line is formed in the direction of sub-scan by column I in the absence of dots in column J. It is inadvisable to skip dots in such cases. This type of procedure may, for example, be carried out in step S806 with regard to the pixel values disposed next to each other in the direction of main scan.

E. Modifications:

The present invention is not limited to the above-described embodiments or embodiments and can be implemented in a variety of ways as long as its essence is not compromised. For example, the following modifications are possible.

E-1. With this embodiment noted above, the overlap count is increased when printing is performed using a high-density nozzle, but [the invention] is not limited to this kind of method, and it is also possible to combine the skipping rate and overlap count such that the printing image bleeding is reduced.

Also, with the embodiment noted above, the overlap count was determined based on the printing mode, and the print data generation contents were determined according to this overlap count, but it is also possible to directly determine the print data generation contents according to the printing mode, or to have the user directly select a print data generation method.

E-2. With the embodiment noted above, bleeding was suppressed by skipping dots, but, for example, it is also possible to cyclically reduce the dot size at the printing device that can form multiple sizes of dots. Generally, for the ink amount reducer used with the present invention, it is acceptable to use an item that regularly reduces the ink volume of dots that form the transverse contour line. Note that in this case, a tone recorded by forming relatively large sized dots correlate to the specific tone specified in the claims.

E-3. With the embodiment noted above, the contour line forms a border with the area for which absolutely no dots are formed. However, the contour line is not limited to this, and can also be a non-continuous part of the characteristic value that specifies an area. For example, the contour line can delimit a border at which the hue changes. This is because the present invention can also suppress bleeding that occurs at this kind of contour, and bleeding that occurs with this kind of contour also degrades the image quality. In this case, dot skipping or dot size changes can be performed at least for one of the areas noted above.

E-4. A decrease in ink volume can be performed according to the printing resolution. For example, it is also possible to decrease ink volume only when the printing resolution is 600 dpi or greater. This is because bleeding from the contour line tends to show up more clearly the higher the printing resolution is, and is especially marked at resolutions of 600 dpi or greater.

E-5. It is also possible to perform ink volume reduction according to the printing medium. This is because the effect of the present invention is especially great with a printing medium such as plain paper with a low ink absorption volume.

E-6. With the embodiment noted above, the half tone data is processed, a contour line is identified, and this is used to perform ink volume reduction processing. However, the contour line identification method is not limited to this. For example, when data that defines a contour line such as an outline font is used for printing, it is possible to directly use the contour line data generated from this outline data to perform ink volume reduction processing. Specifically, the present invention generally can be used for technology that suppresses bleeding of contour lines by processing dot data that shows the dot formation status.

E-7. With the embodiment noted above, an interlace recording method is used. Here, "interlace recording method" means a recording method used when performing printing at a higher resolution than the nozzle pitch measured along the sub scan direction of the printing head. However, the present invention can also be used for recording methods that perform band feed. Here, "band feed" means setting and feeding a sub scan volume to a length value measured along the sub scan direction of an area formed by a plurality of the same hue nozzle groups that can form an array of dots with one main scan.

E-8. With the embodiment noted above, an interlace recording method is used. Here, "interlace recording method" means a recording method used when performing printing at a higher resolution than the nozzle pitch measured along the sub scan direction of The present invention can be adapted not only to color printing but also to monochromatic printing. The invention can also be adapted to printing in which multiple gray scales are expressed by expressing a single pixel with a plurality of ink dots. Using the present invention with drum printers is yet another option. In a drum printer, the direction of drum rotation corresponds to main scan; the direction of carriage travel, to sub-scan. Finally, the present invention can be adapted not only to ink-jet printers but also to any other common ink-jet recording device in which images are recorded on the surface of a print medium with the aid of a recording head having a plurality of nozzle arrays.

E-9. In the above working examples, software can be used to perform some of the hardware functions, or, conversely, hardware can be used to perform some of the software functions. For example, some or all of the functions performed by the printer driver 96 shown in FIG. 1 can be performed by the control circuit 40 inside the printer 20 In this case, some or all of the functions performed by the computer 88, which is a print control device for compiling print data, can be performed by the control circuit 40 of the printer 20.

When some or all of the functions of the present invention are performed by software, this software (computer programs) can be furnished after being stored on a computer-readable recording medium. As used herein, the term "computer-readable recording medium" is not limited to portable recording media such as floppy disks or CD-ROMs and also includes RAM, ROM, and other internal computer storage devices, as well as hard disks and other external storage devices immovably mounted in computers.

What is claimed is:

1. A method of recording an image by forming ink dots on a print medium during main scans, comprising the steps of:
    (a) generating dot data from image data indicative of the image, the dot data representing a state of dot formation at each pixel;
    (b) identifying a transverse contour line of a specific type image area represented by the dot data, the transverse contour line being parallel to a main scan direction, the specific type image are being composed of pixels at which specific tones are recorded by forming ink dots;
    (c) adjusting the dot data so as to regularly reduce amounts of an ink for forming ink dots on the identified transverse contour line; and
    (d) recording tones of pixels on the print medium by forming ink dots in response to the adjusted dot data;
    wherein the step (d) includes the step of: (e) recording the tones of pixels such that adjacent pixels in the main scan direction are recorded during different main scans, respectively.

2. The method in accordance with claim 1, wherein the step (e) includes the step of forming ink dots such that adjacent ink dots in the main scan direction on the identified transverse contour line are formed during different main scans, respectively.

3. The method in accordance with claim 1, wherein the step(e) is executed when the print medium is a plain paper.

4. The method in accordance with claim 1, wherein the step(e) is executed when recording with a resolution of at least 600 dpi in the main scan direction.

5. The method in accordance with claim 1, further comprising the step of providing a print head having a high-density nozzle array, the high-density nozzle array being a plurality of nozzles arrayed in a nozzle pitch of at most $\frac{1}{300}$ inch in a sub-scan direction, wherein the step(e) is executed when recording with the high-density nozzle array.

6. The method in accordance with claim 1, wherein
the step (d) is capable of recording the tones of pixels with a plurality of combination of main scan and sub-scan print resolutions, the plurality of combination including a high ratio resolution combination and a low ratio resolution combination, the high ratio resolution combination having a higher ratio than the low ratio resolution combination, the ratio being of a print resolution of main scan direction to a print resolution of sub-scan direction; and the step(c) further includes the step of reducing relatively more amounts of an ink for forming dots on the identified transverse contour line when recording with the high ratio resolution combination, while reducing relatively less amounts of an ink for forming dots on the identified transverse contour line when recording with the low ratio resolution combination.

7. A printing apparatus for recording an image by forming ink dots on a print medium during main scans, comprising:
    a dot data generator configured to generate dot data from image data indicative of the image, the dot data representing a state of dot formation at each pixel;
    a contour line identifier configured to identify a transverse contour line of a specific type image area represented by the dot data, the transverse contour line being parallel to a main scan direction, the specific type image area being composed of pixels at which specific tones are recorded by forming ink dots;
    a dot data adjuster configured to adjust the dot data so as to regularly reduce amounts of an ink for forming ink dots on the identified transverse contour line; and
    a tone recorder configured to record tones of pixels on the print medium by forming ink dots in response to the adjusted dot data;
    wherein the tone recorder is configured to record the tones of pixels such that adjacent pixels in the main scan direction are recorded during different main scans, respectively.

8. The printing apparatus in accordance with claim 7, wherein
the tone recorder is further configured to form ink dots such that adjacent ink dots in the main scan direction on the identified transverse contour line are formed during different main scans, respectively.

9. The printing apparatus in accordance with claim 7, wherein
the tone recorder records the tones of pixels such that adjacent pixels in the main scan direction are recorded during different main scans, respectively when the print medium is a plain paper.

10. The printing apparatus in accordance with claim 7, wherein
the tone recorder records the tones of pixels such that adjacent pixels in the main scan direction are recorded during different main scans, respectively when recording with a resolution of at least 600 dpi in the main scan direction.

11. The printing apparatus in accordance with claim 7, further comprising a print head having a high-density nozzle array, the high-density nozzle array being a plurality of nozzles arrayed in a nozzle pitch of at most $\frac{1}{300}$ inch in a sub-scan direction, wherein the tone recorder records the tones of pixels such that adjacent pixels in the main scan direction are recorded during different main scans, respectively when recording with the high-density nozzle array.

12. The printing apparatus in accordance with claim 7, wherein
the tone recorder is capable of recording the tones of pixels with a plurality of combination of main scan and sub-scan print resolutions, the plurality of combination including a high ratio resolution combination and a low ratio resolution combination, the high ratio resolution combination having a higher ratio than the low ratio resolution combination, the ratio being of a print resolution of main scan direction to a print resolution of sub-scan direction; and
the dot data adjuster is further configured for reducing relatively more amounts of an ink for forming dots on the identified transverse contour line when recording with the high ratio resolution combination, while reducing relatively less amounts of an ink for forming dots on the identified transverse contour line when recording with the low ratio resolution combination.

13. A printing control apparatus for generating print data to be supplied to a print unit to record an image by forming ink dots on a print medium during main scans, the printing control apparatus comprising:
a dot data generator configured to generate dot data from image data indicative of the image, the dot data representing a state of dot formation at each pixel;
a contour line identifier configured to identify a transverse contour line of a specific type image area represented by the dot data, the transverse contour line being parallel to a main scan direction, the specific type image area being composed of pixels at which specific tones are recorded by forming ink dots;
a dot data adjuster configured to adjust the dot data so as to regularly reduce amounts of an ink for forming ink dots on the identified transverse contour line; and
a print data generator configured to generate the print data in response to the adjusted dot data, the print data being configured to effect recording tones of pixels such that adjacent pixels in the main scan direction are recorded during different main scans, respectively.

14. The printing control apparatus in accordance with claim 13, wherein
the print data generator is further configured to generate the print data to effect recording the tones of pixels such that adjacent ink dots in the main scan direction on the identified transverse contour line are formed during different main scans, respectively.

15. The printing control apparatus in accordance with claim 13, wherein
the print data generator generates the print data to effect recording the tones of pixels such that adjacent pixels in the main scan direction are recorded during different main scans, respectively when the print medium is a plain paper.

16. The printing control apparatus in accordance with claim 13, wherein
the print data generator generates the print data to effect recording the tones of pixels such that adjacent pixels in the main scan direction are recorded during different main scans, respectively when recording with a resolution of at least 600 dpi in the main scan direction.

17. The printing control apparatus in accordance with claim 13, wherein
the print unit comprises a print head having a high-density nozzle array, the high-density nozzle array being a plurality of nozzles arrayed in a nozzle pitch of at most 1/300 inch in a sub-scan direction; and
the print data generator generates the print data to effect recording the tones of pixels such that adjacent pixels in the main scan direction are recorded during different main scans, respectively when recording with the high-density nozzle array.

18. The printing control apparatus in accordance with claim 13, wherein
the print unit is capable of recording the tones of pixels with a plurality of combination of main scan and sub-scan print resolutions, the plurality of combination including a high ratio resolution combination and a low ratio resolution combination, the high ratio resolution combination having a higher ratio than the low ratio resolution combination, the ratio being of a print resolution of main scan direction to a print resolution of sub-scan direction; and
the dot data adjuster is further configured for reducing relatively more amounts of an ink for forming dots on the identified transverse contour line when recording with the high ratio resolution combination, while reducing relatively less amounts of an ink for forming dots on the identified transverse contour line when recording with the low ratio resolution combination.

19. A computer program product for causing a computer to generate print data to be supplied to a print unit to record an image by forming ink dots on a print medium during main scans, the computer program product comprising:
a computer readable medium; and
a computer program stored on the computer readable medium, the computer program comprising:
a first program for causing the computer to generate dot data from image data indicative of the image, the dot data representing a state of dot formation at each pixel;
a second program for causing the computer to identify a transverse contour line of a specific type image area represented by the dot data, the transverse contour line being parallel to a main scan direction, the specific type image are being composed of pixels at which specific tones are recorded by forming ink dots;
a third program for causing the computer to adjust the dot data so as to regularly reduce amounts of an ink for forming ink dots on the identified transverse contour line; and
a fourth program for causing the computer to generate the print data in response to the adjusted dot data, the print data being configured to effect recording tones of pixels such that adjacent pixels in the main scan direction are recorded during different main scans, respectively.

20. The computer program product in accordance with claim 19, wherein
the fourth program is further configured for causing the computer to generate the print data to effect recording the tones of pixels such that adjacent ink dots in the main scan direction on the identified transverse contour line are formed during different main scans, respectively.

21. The computer program product in accordance with claim 19, wherein the fourth program is further configured for causing the computer to generate the print data to effect recording the tones of pixels such that adjacent pixels in the main scan direction are recorded during different main scans, respectively when the print medium is a plain paper.

22. The computer program product in accordance with claim 19, wherein the fourth program is further configured for causing the computer to generate the print data to effect recording the tones of pixels such that adjacent pixels in the main scan direction are recorded during different main scans, respectively when recording with a resolution of at least 600 dpi in the main scan direction.

23. The computer program product in accordance with claim 19, wherein the print unit comprises a print head having a high-density nozzle array, the high-density nozzle array being a plurality of nozzles arrayed in a nozzle pitch of at most 1/300 inch in a sub-scan direction; and the fourth program is further configured for causing the computer to generate the print data to effect recording the tones of pixels such that adjacent pixels in the main scan direction are recorded during different rain scans, respectively when recording with the high-density nozzle array.

24. The method in accordance with claim 19, wherein the print unit is capable of recording tones of pixels with a plurality of combination of main scan and sub-scan print resolutions, the plurality of combination including a high ratio resolution combination and a low ratio resolution combination, the high ratio resolution combination having a higher ratio than the low ratio resolution combination, the ratio being of a print resolution of main scan direction to a print resolution of sub-scan direction; and the third program is configured for reducing relatively more amounts of an ink for forming dots on the identified transverse contour line when recording with the high ratio resolution combination, while reducing relatively less amounts of an ink for forming dots on the identified transverse contour line when recording with the low ratio resolution combination.

* * * * *